United States Patent
Agrawal et al.

(10) Patent No.: US 6,263,700 B1
(45) Date of Patent: Jul. 24, 2001

(54) MULTIEFFECT DISTILLATION FOR MULTICOMPONENT SEPARATION

(75) Inventors: Rakesh Agrawal, Emmaus; Jianguo Xu, Wrightstown, both of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/389,267

(22) Filed: Sep. 3, 1999

(51) Int. Cl.$^7$ .................................................. F25J 3/02
(52) U.S. Cl. .................................................. 62/646
(58) Field of Search .................................................. 62/646

(56) References Cited

U.S. PATENT DOCUMENTS

| | | |
|---|---|---|
| 4,246,073 | 1/1981 | Tomio . |
| 4,460,396 | 7/1984 | Kaiser . |
| 5,245,832 | 9/1993 | Roberts .................................. 62/24 |
| 5,722,259 * | 3/1998 | Sorensen et al. ........................ 62/646 |

FOREIGN PATENT DOCUMENTS 0 776 685    6/1997  (EP) .

OTHER PUBLICATIONS

Cheng, H–C and Luyben, W.L., Heat Integrated Distillation Columns for Ternary Separations, [ACS] Ind Eng Chem Res 1985.

Ding, S.S. and Luyben, W.L., Control of a Heat–Integrated Complex Distillation Column, Ind Engr. Chem, Res. 1990.

Tyreus, B.D. et al., "Two Towers Cheaper Than One?", Energy Management, *Hydrocarbon Processing*, Jul. 1975, pp. 93–96.

Wankat, Phillip C., "Multieffect Distillation Processes", *Ind. Eng. Chem. Res.* 1993, 32, 894–905.

Annakon, Omar et al., "Rigorous Comparative Study of Energy–Integrated Distillation Schemes", *Ind. Eng. Chem. Res.* 1996, 35, 1877–1885.

Fidkowski, Zbigniew et al., "Minimum Energy Requirements of Thermally Coupled Distillation Systems", *AIChE Journal*, Apr. 1987, vol. 33, No. 4.

Rathore, R.N.S. et al., "Synthesis Strategies for Multicomponent Separation Systems with Energy Integration", *AIChE Journal*, (vol. 20, No. 3), May 1974.

Rathore, R.N.S. et al. "Synthesis of Distillation Systems with Energy Integration", *AIChE Journal*, (vol. 20, No. 5) pp. 940–950, Sep., 1974.

Andrecovich, M.J. et al., "A Simple Synthesis Method Based on Utility Bounding for Heat–Integrated Distillation Sequences", AIChE Journal (vol. 31, No. 3).

* cited by examiner

*Primary Examiner*—Corrine McDermott
*Assistant Examiner*—Malik N. Drake
(74) *Attorney, Agent, or Firm*—Willard Jones, II

(57) ABSTRACT

An efficient multieffect distillation process separates multicomponent mixtures containing three or more components into product streams each enriched in one of the components. The distillation process consists of at least two distillation columns that are thermally linked. A mixture stream that can be the given feed or a stream recovered from another distillation column and containing three or more components is fed to one of the thermally linked distillation columns and at least two submixture streams are produced from this distillation column and transferred to other distillation columns for further distillation. At least one of the submixture streams is transferred to the other thermally linked distillation column. One submixture stream is lean in the least volatile component of the mixture feed and the other submixture stream is lean in the most volatile component of the mixture feed.

31 Claims, 12 Drawing Sheets

MULTIEFFECT DISTILLATION FOR MULTICOMPONENT SEPARATION

CROSS-REFERENCE TO RELATED APPLICATIONS

Not Applicable.

STATEMENT REGARDING FEDERALLY SPONSORED RESEARCH FOR DEVELOPMENT

Not Applicable.

BACKGROUND OF THE INVENTION

The present invention pertains to the field of distillation of fluid mixtures, and in particular to multieffect distillation processes to separate multicomponent mixtures containing three or more components into product streams each enriched in one of the components.

Multieffect distillation has long been considered as one of the methods to reduce energy consumption in distillation columns. In a multieffect distillation, two heat integrated distillation columns are used. This heat integration is achieved by operating one column at a higher pressure than the other. Feed is fed to one of the distillation columns. The vapor from the top of the high pressure column is condensed by heat exchange with the liquid at the bottom of the low pressure column. Thus, the vapor in the high pressure column provides the boilup duty for the low pressure column.

There are several studies on the use of multieffect distillation for a binary feed distillation, the earliest being that of distilling air to produce nitrogen and oxygen. For this purpose, air is treated as a binary mixture and is fed to a high pressure column. The crude liquid oxygen from the bottom of the high pressure column is fed to an intermediate location of the low pressure column. The bottom of the low pressure column is boiled by condensing the nitrogen vapor from the top of the high pressure column. Both nitrogen and oxygen are produced from the low pressure column.

There are several more multieffect distillation processes for binary distillation. Details of these appear in a paper by Wankat ("Multieffect Distillation Processes", P. C. Wankat, Ind. Eng. Chem. Res., pages 894–905, volume 32, 1993). Tyreus and Luyben studied the multieffect distillation for propylene-propane and methanol-water separations ("Two Towers Cheaper Than One?", B. D. Tyreus and W. L. Luyben, Hydrocarbon Processing, pages 93–96, July 1975). They found that as compared to a conventional single distillation column, the multieffect distillation consisting of two distillation columns required about 46% less steam for propylene-propane separation and about 40% less steam for methanol-water separation.

Recently, multieffect distillation processes for the distillation of ternary feed mixtures have been explored. This is due to an attractive feature of multieffect distillation in reducing the boilup needs from an external heat source.

U.S. Pat. No. 5,245,832 (Roberts) discloses a multieffect distillation process consisting of three thermally linked distillation columns to separate air into three product streams each enriched in oxygen, argon and nitrogen respectively. In that process at most one stream containing significant quantities of at least two components is drawn from a thermally linked column for further distillation.

Annakou and Mizsey ("Rigorous Comparative Study of Energy-Integrated Distillation Processes", O. Annakou and P. Mizsey, Ind. Eng. Chem. Res., pages 1877–1885, Volume 35, 1996) have proposed four multieffect distillation processes each consisting of two distillation columns to distill a given ternary mixture. These four prior art processes are shown in FIGS. 1 through 4. In these processes, a ternary mixture having components A, B and C (mixture ABC) is separated into three product streams each enriched in one of the components. A is the most volatile component and C is the least volatile component.

In the prior art process of FIG. 1, the ternary feed mixture 100 is fed to an intermediate location of the high pressure column 110. (A location of a distillation column is an "intermediate location" when there is at least one separation stage above and one separation stage below that location. A "separation stage" is a mass transfer contact device between liquid and vapor phases, such as a suitable mass transfer tray or a packed height of a suitable packing.) The vapor stream 184 enriched in component A from the top of the high pressure column is condensed in the reboiler/condenser 116. A portion of the condensed stream 186 provides the reflux for the high pressure column and the other portion provides the A-enriched product stream 190. From the bottom of the high pressure column, a portion of the A-lean binary stream that is enriched in components B and C (stream 140) is recovered as stream 142. The pressure of this stream is reduced across valve 130 and fed to the low pressure column 120. A product stream 198 enriched in component B is produced from the top of the low pressure column, and product stream 194 enriched in the heaviest component C is produced from the bottom of this column. The boilup at the bottom of the low pressure column is provided by vaporizing some bottom liquid in the reboiler/condenser 116. This reboiler/condenser provides thermal linking between the high pressure column and the low pressure column.

The prior art process in FIG. 2 is similar to the one in FIG. 1 in that it also uses a high pressure column 110 and a low pressure column 120 that are thermally linked through a reboiler/condenser 116. However, the feed stream 100 is now fed to an intermediate location of the low pressure column, and the product stream 190 enriched in the most volatile component A is recovered from the top of this column. The A-lean and essentially binary stream 140 containing components B and C is now collected from the bottom of the low pressure column and is increased in pressure across a pump 236 and then fed as stream 144 to the high pressure column 110. The high pressure column produces two product streams (198, 194) each enriched in components B and C respectively.

The prior art process of FIG. 3 is similar to the one in FIG. 1 in that it also uses a high pressure column 110 and a low pressure column 120 that are thermally linked through a reboiler/condenser 116. The feed stream 100 also is fed to an intermediate location of the high pressure column. However, rather than producing an A-enriched product stream from the top of the high pressure column, a product stream 194 enriched in the heaviest component C is produced from the bottom of this column. The vapor stream 350 at the top of the high pressure column is now lean in C but rich in both components A and B. After condensation, a portion of the condensed stream is withdrawn as stream 356, reduced in pressure across a valve 330 and fed to the low pressure column. The product streams (190, 198) enriched in components A and B are produced from the low pressure column.

The prior art process of FIG. 4 also uses a high pressure column 110 and a thermally linked low pressure column 120. The feed mixture is fed to an intermediate location of the low pressure column. The C-enriched product stream 194 is recovered from the bottom of the low pressure column. A mixture lean in C but rich in A and B is recovered as stream 356 from the top of the low pressure column, pumped through pump 436 and fed to the high pressure column. The high pressure column produces the A-enriched and the B-enriched product streams (190, 198).

A common feature of all the prior art processes in FIGS. 1 through 4 is that the ternary feed mixture is fed to one of the two thermally linked columns. In the distillation column, the feed is distilled into a product stream at one end and an essentially binary mixture stream at the other end. The binary mixture is then fed to the other distillation column and a product stream is recovered from each end of this distillation column. In all, three product streams each enriched in one of the components is produced.

It is well known that among the conventional distillation column processes, a fully thermally coupled distillation system requires the lowest heat duty for a ternary distillation ("Minimum Energy Requirements of Thermally Coupled Distillation Systems", Z. Fidkowski and L. Królikowski, AIChE Journal, pages 643–653, Volume 33, 1987). However, Annakon and Mizsey found that the multieffect distillation column processes of FIGS. 1 through 4 generally required less heat duty than the fully thermally coupled distillation system. The ternary mixtures studied by them are: pentane-hexane-heptane; isopentane-pentane-hexane; and butane-isopentane-pentane. Furthermore, they found that in the cases of relatively pure products, the multieffect distillation process is always the most economical solution.

Multieffect distillation processes containing more than two distillation columns for feed mixtures containing more than three components are also available in the literature. Rathore, Vanwormer and Powers have described distillation processes with four distillation columns to distill a five-component feed mixture in five product streams each enriched in one of the components ("Synthesis strategies for multicomponent separation systems with energy integration", R. N. S. Rathore, K. A. VanWormer and G. J. Powers, AICHE Journal, pages 491–502, volume 20, 1974; and "Synthesis of Distillation Systems with Energy Integration",R. N. S. Rathore, K. A. VanWormer and G. J. Powers, Aiche Journal, pages 940–950, volume 20, 1974). Andrecovich and Westerberg have also studied a multieffect distillation process containing seven distillation columns to distill a five-component mixture ("A simple synthesis method based on utility bounding for heat-integrated distillation sequences", M. K. Andrecovich and A. W. Westerberg, Aiche Journal, pages 363–375, volume 31, 1985). The five-component examples presented in these studies are: propane (A), i-butane (B), n-butane (C), i-pentane (D), and n-pentane (E); and ethanol (A), isopropanol (B), n-propanol (C), isobutanol (D) and n-butanol (E). In all these examples, a mixture introduced to a thermally linked distillation column is either separated into two product streams each enriched in one of the components or one product stream enriched in one of the components and the other that is a submixture which is sent to another distillation column for further distillation. This constraint limits the efficiency of these multieffect distillation processes.

It is desired to have more efficient multieffect distillation processes with lower heat demand than the prior art multieffect distillation processes for the distillation of a multicomponent feed mixture.

It is further desired to have multieffect distillation processes that are easy to operate while having low heat requirements.

It is still further desired to have multieffect distillation processes which overcome the difficulties and disadvantages of the prior art to provide better and more advantageous results.

BRIEF SUMMARY OF THE INVENTION

The present invention is a multieffect distillation process which separates multicomponent mixtures containing three or more components into product streams each enriched in one of the components.

A first embodiment of the invention is a process for multieffect distillation of a multicomponent fluid containing at least three components, each component having a different volatility, into at least three product streams. The process uses a distillation column system having at least two distillation columns, including a first distillation column operating at a first pressure and a second distillation column operating at a second pressure. The first and second distillation columns are thermally linked and each distillation column has a top, a bottom, and a plurality of locations between the top and the bottom of the column. The process comprises multiple steps. The first step is to feed a mixture stream into the first distillation column at a first location, said mixture stream containing at least three components. The second step is to withdraw a first submixture stream lean in a component having a lowest volatility from the first distillation column. The third step is to withdraw a second submixture stream lean in a component having a highest volatility from the first distillation column. The fourth step is to feed at least one of the first and second submixture streams into the second distillation column. The fifth step is to remove from the distillation column system a first product stream rich in the component having the lowest volatility, a second product rich in the component having the highest volatility, and at least one other product stream rich in a component having an intermediate volatility, said intermediate volatility being between the highest volatility and the lowest volatility.

The mixture stream fed into the first distillation column in the first step may be the multicomponent fluid. The multicomponent fluid may be from the group consisting of nitrogen/oxygen/argon mixtures, benzene/toluene/xylene mixtures, nitrogen/carbon monoxide/methane mixtures, combinations of three or more components from C1 to C5 alcohols, and hydrocarbon mixtures, said hydrocarbon mixtures being selected from the group consisting of pentane-hexane-heptane, isopentane-pentane-hexane, butane-isopentane-pentane, iso-butane-n-butane-gasoline, and combinations of three or more components from C1 to C6 hydrocarbons or $C_4$ isomers.

In a second embodiment, which includes the same multiple steps as in the first embodiment, the first submixture stream is withdrawn from the first distillation column at a location above the first location.

In a third embodiment, the second submixture stream is withdrawn from the first distillation column at a location below the first location.

In a fourth embodiment, the first product stream removed from the distillation column system is removed from the bottom of the second distillation column, the second product stream removed from the distillation column system is removed from the top of the second distillation column, and the at least one other product stream removed from the distillation column system is removed from an intermediate location of the second distillation column.

A fifth embodiment has the same multiple steps as the first embodiment, but includes the additional step of removing from the distillation column system a fourth product stream rich in the component having the highest volatility. In one variation of this embodiment, the fourth product removed from the distillation column system is removed from the top of the first distillation column.

A sixth embodiment has the same steps as the second embodiment, but includes the further step of removing from the distillation column system a fifth product stream rich in the component having the lowest volatility (i.e., the sixth step). In a variation of the sixth embodiment, the fifth product stream is removed from the bottom of the first distillation column.

A seventh embodiment has the same steps as the sixth embodiment, but includes eight additional steps (i.e., steps 7–14). The seventh step is to provide a third distillation column operating at a pressure lower than the operating pressure of one of the first and second distillation columns and about the same as the operating pressure of the other column. The eighth step is to withdraw a third submixture stream lean in a component having a highest volatility from the first distillation column. The ninth step is to feed the third submixture into the third distillation column. The tenth step is to withdraw a fourth submixture stream lean in a component having a lowest volatility from the first distillation column. The eleventh step is to feed the fourth submixture stream into the third distillation column. The twelfth step is to remove from the third distillation column a sixth product stream rich in the component having the lowest volatility. The thirteenth step is to remove from the third distillation column a seventh product stream rich in the component having the highest volatility. The fourteenth step is to remove from the third distillation column at least one other product stream rich in a component having an intermediate volatility, said intermediate volatility being between the highest volatility and the lowest volatility.

An eighth embodiment has the same five steps as the first embodiment, but includes the additional step of removing from the distillation column system a fourth product stream rich in the component having the lowest volatility. In a variation of the eighth embodiment, the fourth product stream removed from the distillation column system is removed from the bottom of the first distillation column.

In a ninth embodiment, the first pressure is higher than the second pressure. This embodiment has the same multiple steps as the first embodiment.

A tenth embodiment has the same multiple steps as the ninth embodiment, but includes the additional step of reducing the pressure of at least one of the first and second submixture streams withdrawn from the first distillation column before the at least one submixture stream is fed into the second distillation column. In one variation of the tenth embodiment, at least one of the first and second submixture streams is withdrawn from the first distillation column as a liquid. In another variation, at least one of the first and second submixture streams is withdrawn from the first distillation column as a vapor.

In one variation of the ninth embodiment, the first and second distillation columns are thermally linked by condensing at least a portion of a vapor stream from the top of the first distillation column by heat exchange against at least a portion of a bottoms liquid from the bottom of the second distillation column. In another variation, the first and second distillation columns are thermally linked by condensing at least a portion of a vapor stream from an intermediate location above the first location by heat exchange against at least a portion of a bottoms liquid from the bottom of the second distillation column.

In an eleventh embodiment, which has the same multiple steps as the first embodiment, the first pressure is lower than the second pressure. In a variation of the eleventh embodiment, the first and second distillation columns are thermally linked by condensing at least a portion of a vapor stream from the top of the second distillation column by heat exchange against at least a portion of a bottoms liquid from the bottom of the first distillation column.

A twelfth embodiment has the same steps as the eleventh embodiment, but includes the further step of increasing the pressure of at least one of the submixture streams withdrawn from the first distillation column before the at least one submixture stream is fed into the second distillation column. In one variation of the twelfth embodiment, at least one of the first and second submixture streams is withdrawn from the first distillation column as a liquid. In another variation of the twelfth embodiment, at least one of the first and second submixture streams is withdrawn from the first distillation column as a vapor.

Another aspect of the present invention is a cryogenic air separation unit using a process such as that in the first embodiment.

BRIEF DESCRIPTION OF THE DRAWINGS

The invention will be described by way of example with reference to the accompanying drawings in which.

DETAILED DESCRIPTION OF THE INVENTION

Figure 1:
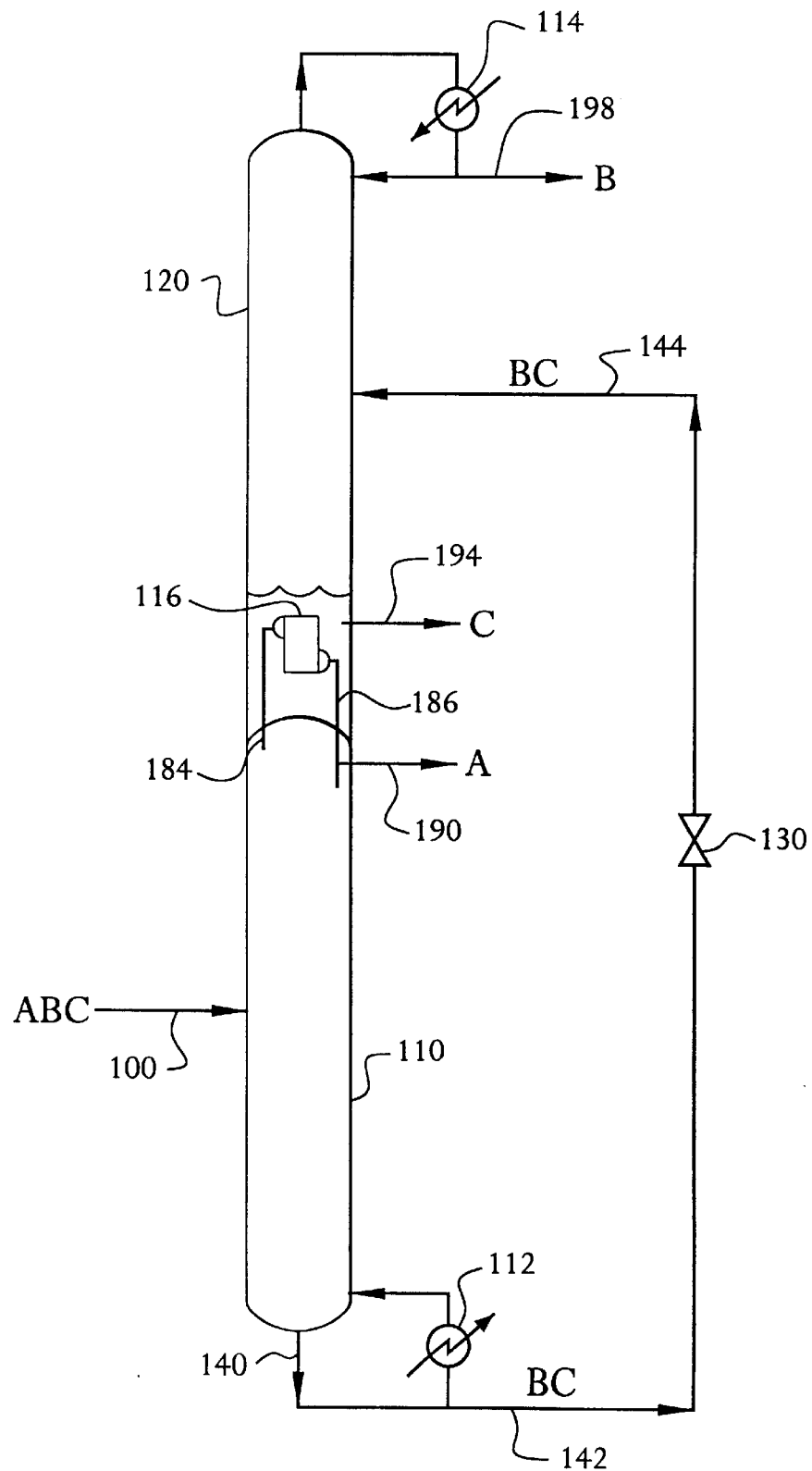
FIGS. 1 through 4 illustrate schematic diagrams of four prior art processes.
Figure 2:
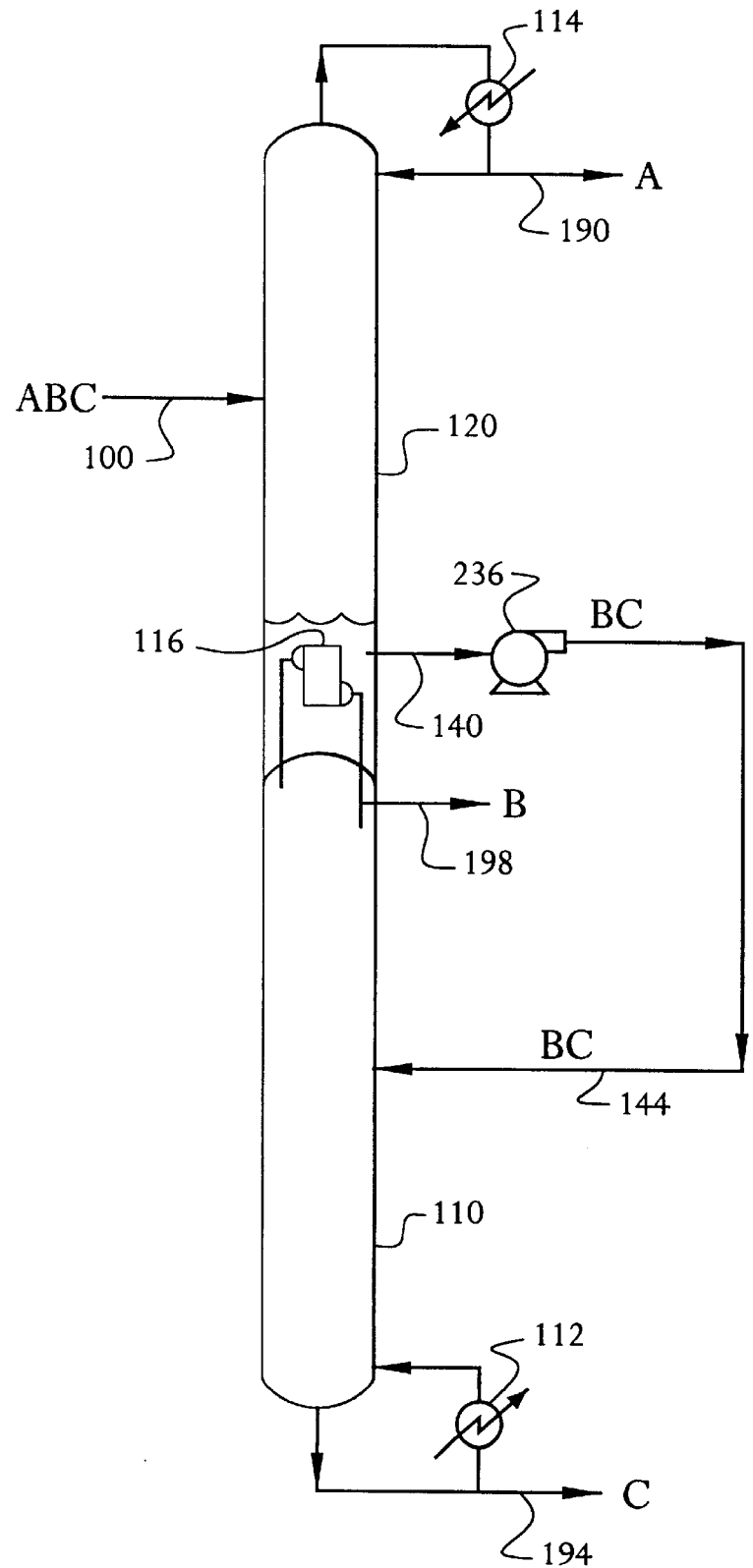
Figure 3:
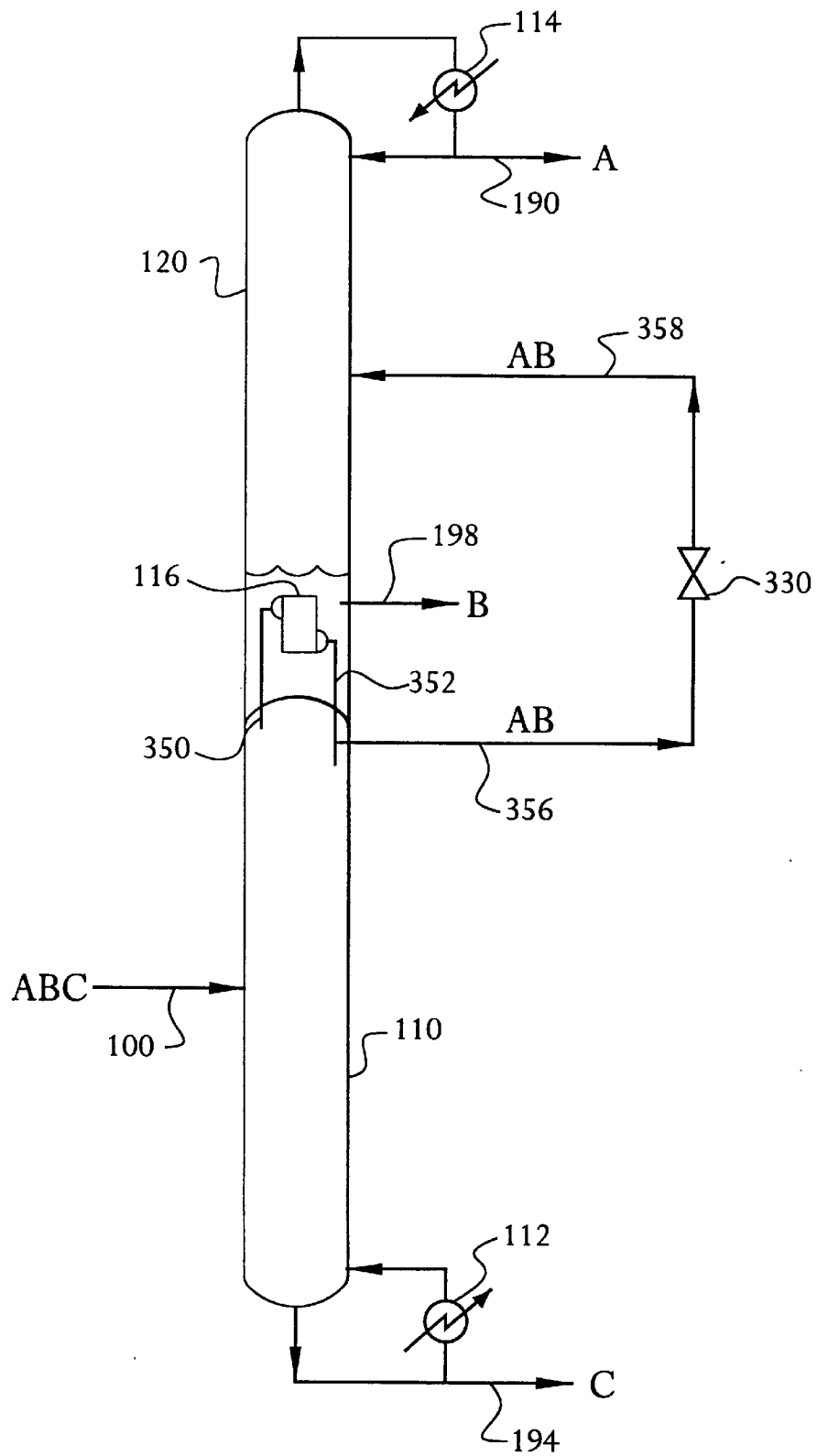
Figure 4:
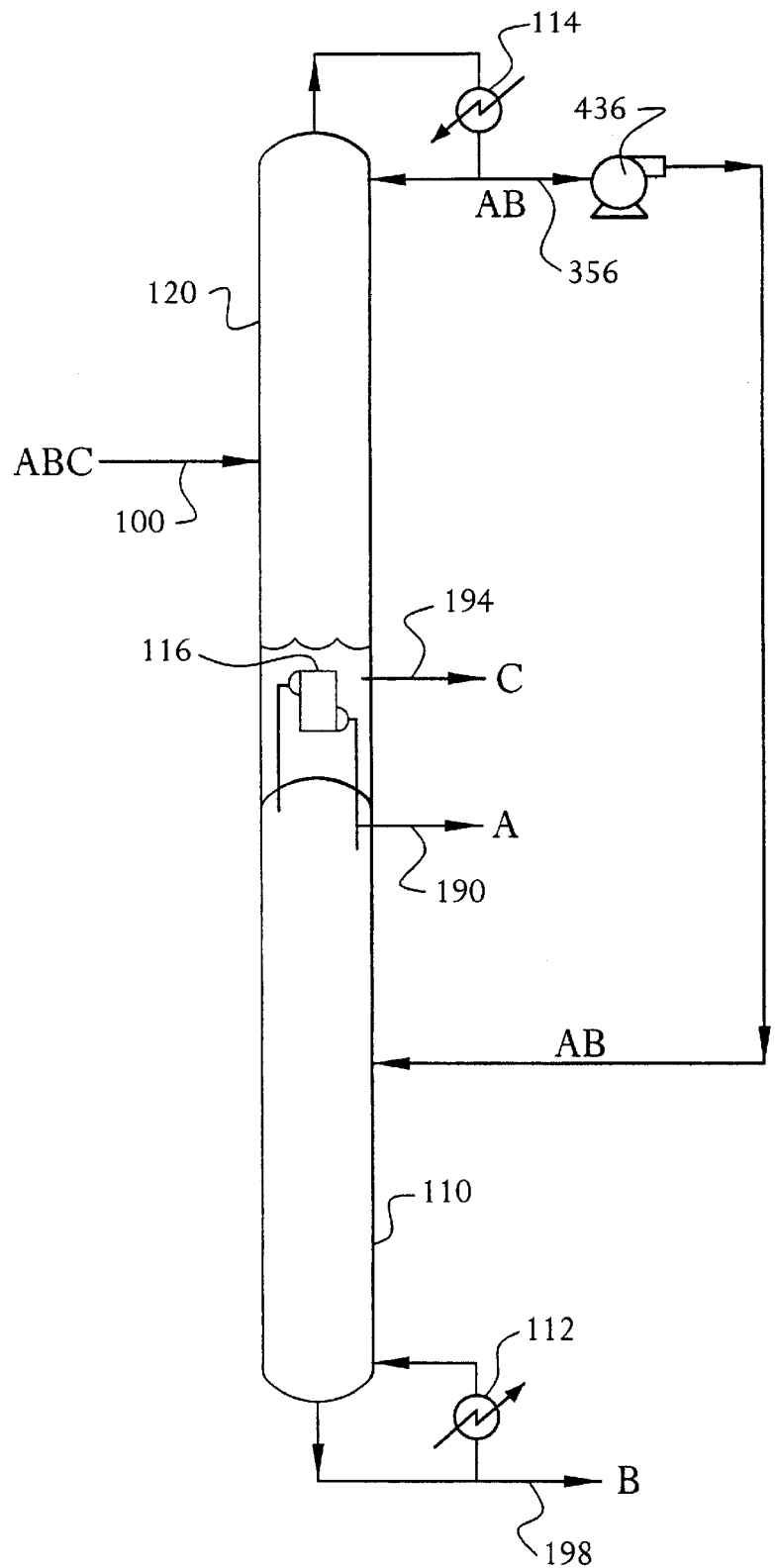

The current invention provides a process for the distillation of a multicomponent feed stream containing three or more components into three or more product streams using at least two distillation columns; the multicomponent feed stream is fed to at least one of the distillation columns which is thermally linked to a second distillation column by condensing at least a portion of a vapor stream from a distillation section above the feed location to the first distillation column by heat exchange against at least a portion of a liquid stream from a distillation section below the feed location of the second distillation column. The process comprises the following steps:

i) a mixture stream containing three or more components from the feed mixture is fed to one of the thermally linked distillation columns;

ii) a submixture stream lean in the least volatile component of the mixture stream is withdrawn from a location above the introduction point of the mixture stream to the thermally linked distillation column of step (i) and sent to another distillation column for further distillation;

iii) a submixture stream lean in the most volatile component of the mixture stream is withdrawn from a location below the introduction point of the mixture stream to the thermally linked distillation column of step (i) and sent to another distillation column for further distillation;

iv) at least one of the submixture streams from either step (ii) or step (iii) is sent to the distillation column that is thermally linked to the thermally linked distillation column of step (i).

One distillation column is a high pressure column and a second distillation column is a low pressure column. The high pressure column operates at a pressure higher than the operating pressure of the low pressure column. The thermal linking preferably is achieved by condensing the vapor from the top of the high pressure column against the liquid from the bottom of the low pressure column. This provides the vapor boilup for the low pressure column. In certain applications, however, the vapor from the top of the high pressure column could provide a boilup at an intermediate location of the low pressure column. Alternatively, the vapor from an intermediate location of the high pressure column could be condensed against the liquid at the bottom of the low pressure column. In other words, a vapor stream could be withdrawn from a suitable location of the high pressure column and condensed by heat exchange against the liquid from a suitable location of the low pressure column.

If needed, some additional boilup duty to the low pressure column can be provided by using a heat source besides the condensation of a vapor stream from the high pressure column. Similarly some additional condensing duty to the high pressure column can be provided by using a cooling source besides the vaporization of the liquid from the low pressure column. In another possibility, multiple vapor streams from different locations of the high pressure column could be withdrawn and condensed by heat exchange with liquids at different locations of the low pressure column.

In step (i) of the invention, the multicomponent feed stream can be the mixture stream that is fed to one of the thermally linked high pressure or the low pressure columns. Alternatively, the multicomponent feed stream could be fed to another distillation column within the process and a mixture stream containing three or more components can be derived from this distillation column. This mixture stream is then treated according to step (i) of the invention. In another alternative, the multicomponent feed stream is fed to one of the distillation columns in the process and distilled streams from this distillation column are sent to other distillation columns in the process. Eventually, a mixture stream containing three or more components is collected from one of the distillation columns in the process and treated according to step (i) of the invention.

The mixture stream in step (i) can be fed to either the high pressure column or the low pressure column. When the mixture stream is fed to the high pressure column, the submixture stream in step (iv) is let down in pressure and fed to the low pressure column. Generally, the pressure can be let down across a valve or an expander generating work. In cases where the mixture is fed to the low pressure column, the submixture stream in step (iv) is increased in pressure and fed to the high pressure column. The increase in pressure is achieved either by the use of a pump or a compressor or by gravitational head.

Generally, the submixture streams in steps (ii) and (iii) are taken out as liquid streams from the thermally linked distillation columns. Sometimes either one or both of the substreams could be taken out either as vapor or two-phase streams. In some cases, the enthalpy of a submixture stream after the withdrawal from the thermally linked distillation column could be changed by a suitable heat exchange prior to feeding it to the other thermally linked distillation column in step (iv). The submixture stream lean in the least volatile component in step (ii) of the invention can be withdrawn either from an intermediate location or the top of the thermally linked distillation column. Generally, this submixture is fed to an intermediate location of the other thermally linked distillation column in step (iv). However, if needed, it could be fed to any suitable location of the other thermally linked distillation column and in particular to the top of the other thermally linked distillation column. The submixture stream lean in the most volatile component in step (iii) of the invention can be withdrawn either from an intermediate location or the bottom of the thermally linked distillation column. Generally, this submixture is fed to an intermediate location of the other thermally linked distillation column in step (iv). However, if needed, it could be fed to any suitable location of the other thermally linked distillation column and in particular to the bottom of the other thermally linked distillation column.

In certain applications more than one submixture stream may be withdrawn from the thermally linked distillation column in either one or both of steps (ii) and (iii). Thus in step (ii), two or more submixture streams each lean in the least volatile component may be withdrawn from suitable locations above the introduction point of the mixture stream to the thermally linked distillation column. These different submixture streams then can be sent to appropriate distillation columns within the process. The same would be true for the submixture streams each lean in the most volatile component that are drawn according to step (iii).

Any product stream could be produced as a liquid or a vapor or a two-phase stream. It also is possible to produce multiple product streams in different thermodynamic states from either end of a distillation column. If needed, a product stream could be produced from an intermediate location of a distillation column.

Prior to the introduction of the mixture stream to the thermally linked distillation column, its enthalpy could be adjusted by a suitable heat exchange. In some instances more than one mixture stream could be fed to the thermally linked distillation column in step (i). These mixture streams could be of the same composition but of different specific enthalpies. It also is possible for these mixture streams to have different compositions.

The invention will now be described in detail with reference to processes shown in FIGS. 5 through 12.

Consider the separation of a ternary mixture containing three constituent components A, B and C. Sometimes, besides these three major constituent components, other components also may be present in small amounts in the feed mixture. Of the three major components, A is the most volatile and C is the least volatile. The objective is to separate the ternary feed mixture into at least three product streams each enriched in one of the three major components. FIGS. 5 through 11 show processes according to the current invention for the separation of such a ternary feed mixture.

Figure 5:
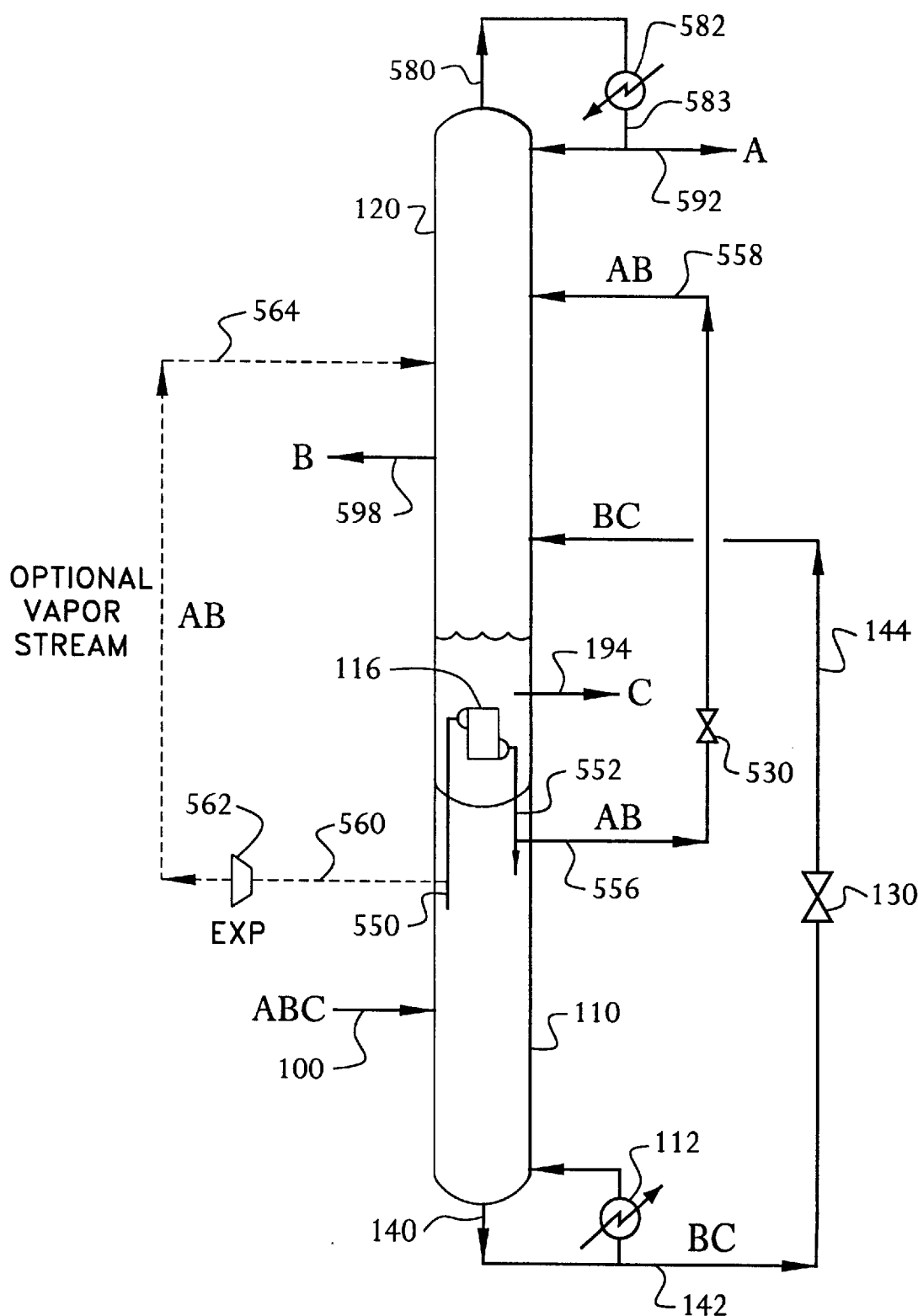
FIG. 5 is a schematic diagram of an embodiment of the present invention.

FIG. 5 shows a process according to the current invention where the thermally linked distillation column of step (i) is the high pressure column and the thermally linked distillation column that is thermally linked to the high pressure column in step (iv) is the low pressure column. The mixture stream in step (i) is the ternary feed stream. Therefore, the feed mixture ABC (stream 100) is fed to the high pressure column 110. The vapor stream 550 from the top of the high pressure column is now lean in C but rich in both components A and B. At least a portion of this vapor stream is condensed in reboiler/condenser 116. According to step (ii) of the invention, a portion of this condensed stream 552 is recovered as a submixture stream 556 lean in the least volatile component C and the other portion is sent as liquid reflux to the high pressure column. The submixture stream 556 lean in the least volatile component C is fed according to step (iv) to an appropriate location of the low pressure column 120. Generally, this location is a couple of stages below the top or at the top of the low pressure column.

Alternatively, a portion of the vapor stream 550 optionally could be withdrawn as a submixture stream 560 lean in the least volatile component C and dropped in pressure across an expander 562 and fed as stream 564 (optional vapor stream) to the low pressure column 120. In certain applications, submixture stream 556 may not be withdrawn from the high pressure column 110 and stream 560 may be the only submixture stream that is lean in the least volatile component C.

The boilup at the bottom of the high pressure column 110 is provided through reboiler 112. According to step (iii) of the invention, a liquid submixture stream 142 lean in the most volatile major component A but containing both components B and C is withdrawn from the bottom liquid 140. The pressure of this liquid submixture is reduced across valve 130 and is fed to the low pressure column 120 as stream 144. In FIG. 5, this submixture stream 144 lean in the most volatile component A is fed at an intermediate location, i.e., there is at least one separation stage above and one separation stage below the feed location. If needed, it could be fed to the bottom sump of the low pressure column.

The boilup to the low pressure column 120 is provided through thermal linking through reboiler/condenser 116 where at least a portion of the bottom liquid is vaporized by heat exchange. A product stream 598 rich in the component of intermediate volatility B is produced from an intermediate location of the low pressure column and a product stream 194 rich in the least volatile component C is produced from the bottom of this distillation column. The vapor stream 580 at the top of the low pressure column 120 is rich in the most volatile component A. The condensing duty and the liquid reflux for the low pressure column is provided through condenser 582. A portion of the condensed stream 583 is recovered as the product stream 592 rich in the most volatile component A.

In certain applications of the process in FIG. 5, when the product stream 592 rich in A is not needed of very high purity, stream 558 could be fed to the top of the low pressure column 120. In such a case there may not be a need for condenser 582.

Figure 6:
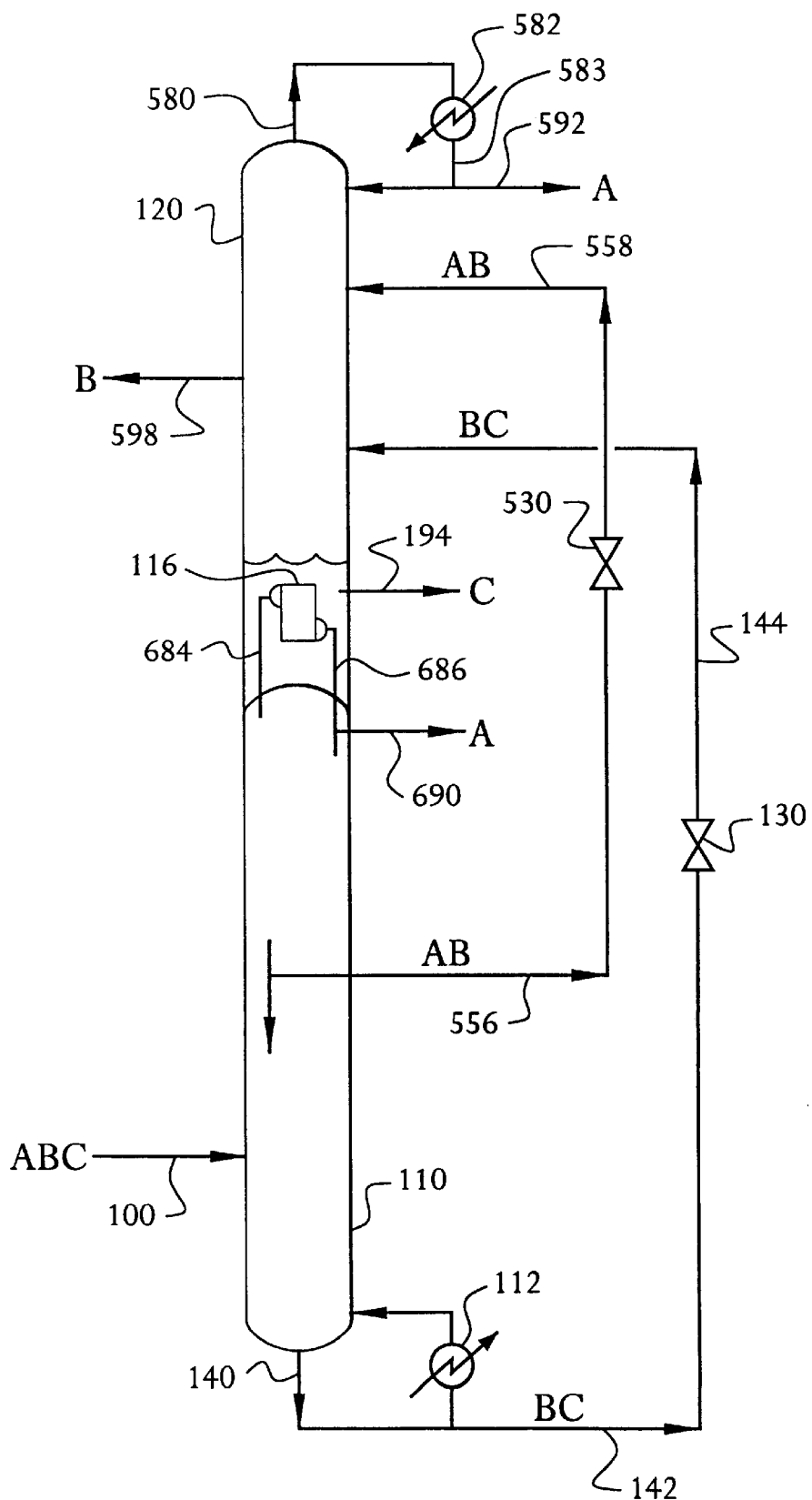
FIG. 6 is a schematic diagram of a second embodiment of the present invention.

FIG. 6 shows another process according to the current invention. This process is similar to the one in FIG. 5 with the only difference that the submixture stream 556 lean in the least volatile component C is now withdrawn from an intermediate location of the high pressure column 110 and a product stream 690 enriched in the most volatile component A is recovered from the top of this column. There is at least one separation stage used between the reboiler/condenser 116 and the withdrawal location for the submixture stream 556 that is lean in the least volatile component C. The vapor stream 684 from the top of the high pressure column is now enriched in A. Now there are two product streams 592 and 690 that are enriched in the most volatile component A. The composition of these two streams may or may not be same. Furthermore, these streams may be combined to give one product stream or kept as separate product streams.

Figure 7:
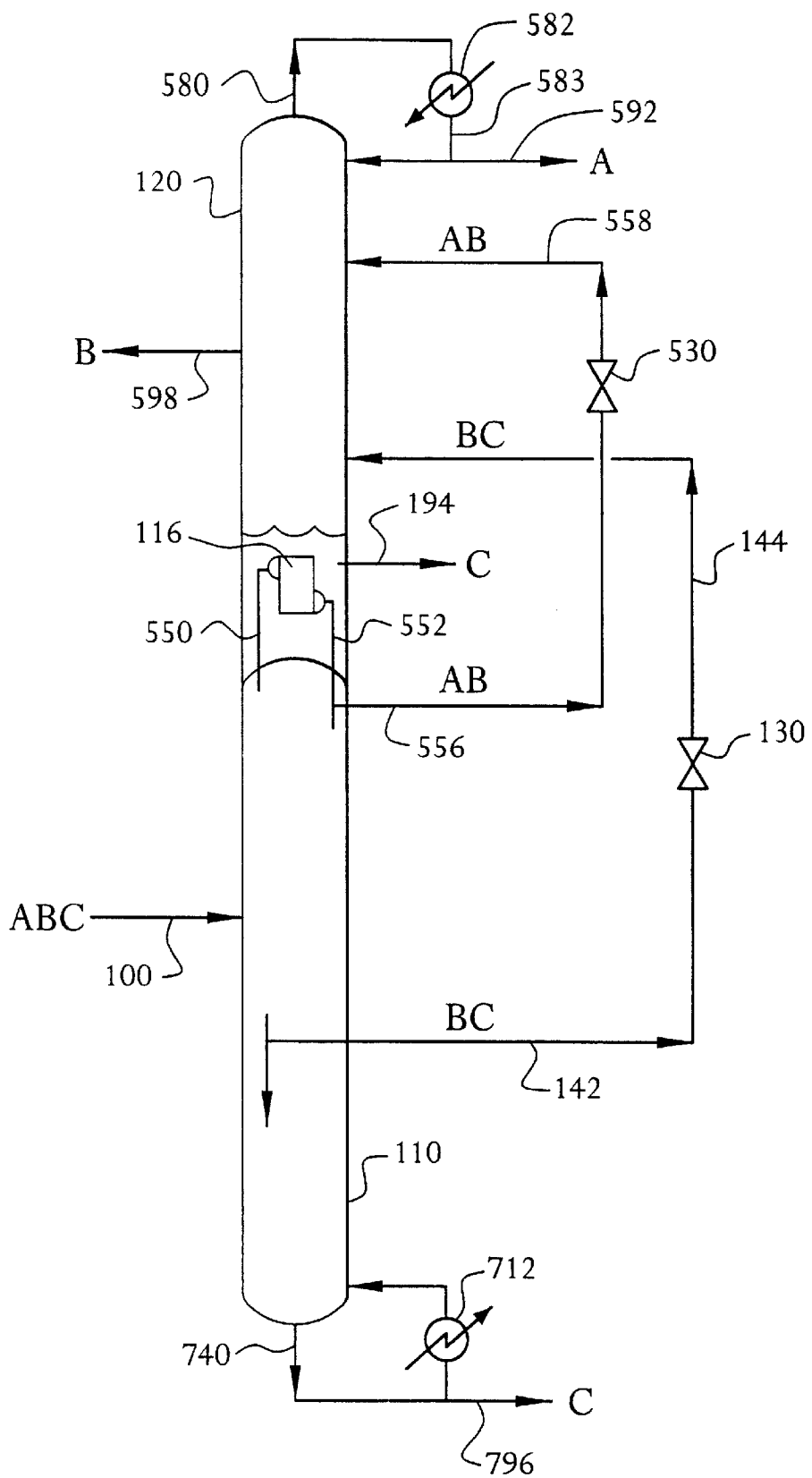
FIG. 7 is a schematic diagram of a third embodiment of the present invention.

FIG. 7 shows another process according to the current invention to distill a ternary mixture. This process is similar to the one in FIG. 5 with the only difference that now the submixture stream 142 lean in the most volatile component A is withdrawn from an intermediate location of the high pressure column 110 and a product stream 796 enriched in the least volatile component C is withdrawn from the bottom of this column. At least one separation stage is used between the withdrawal location of the submixture stream 142 lean in the most volatile component A and the bottom of the high pressure column.

Figure 8:
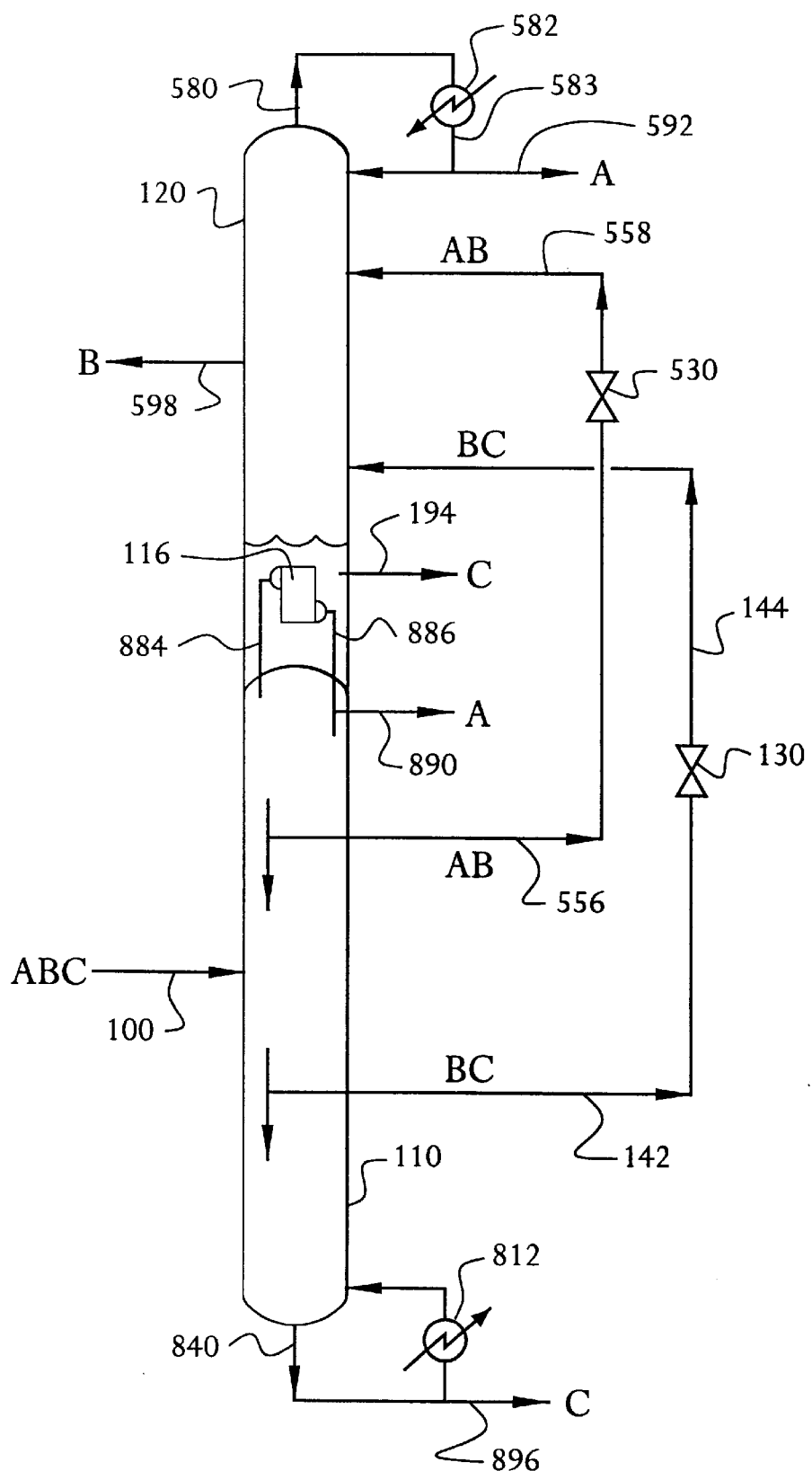
FIG. 8 is a schematic diagram of a fourth embodiment of the present invention.

The process in FIG. 8 also is similar to the one in FIG. 5 with one difference, which is that both the submixture streams (142, 556) are now produced from intermediate locations of the high pressure column 110. Also, a product stream 890 enriched in the most volatile component A is produced from the top of the high pressure column and a product stream 896 enriched in the least volatile component C is produced from the bottom of that column. As compared to the process in FIG. 5, the processes of FIGS. 6 through 8 will generally be more efficient in that these processes generally require less total heat duty.

Figure 9:
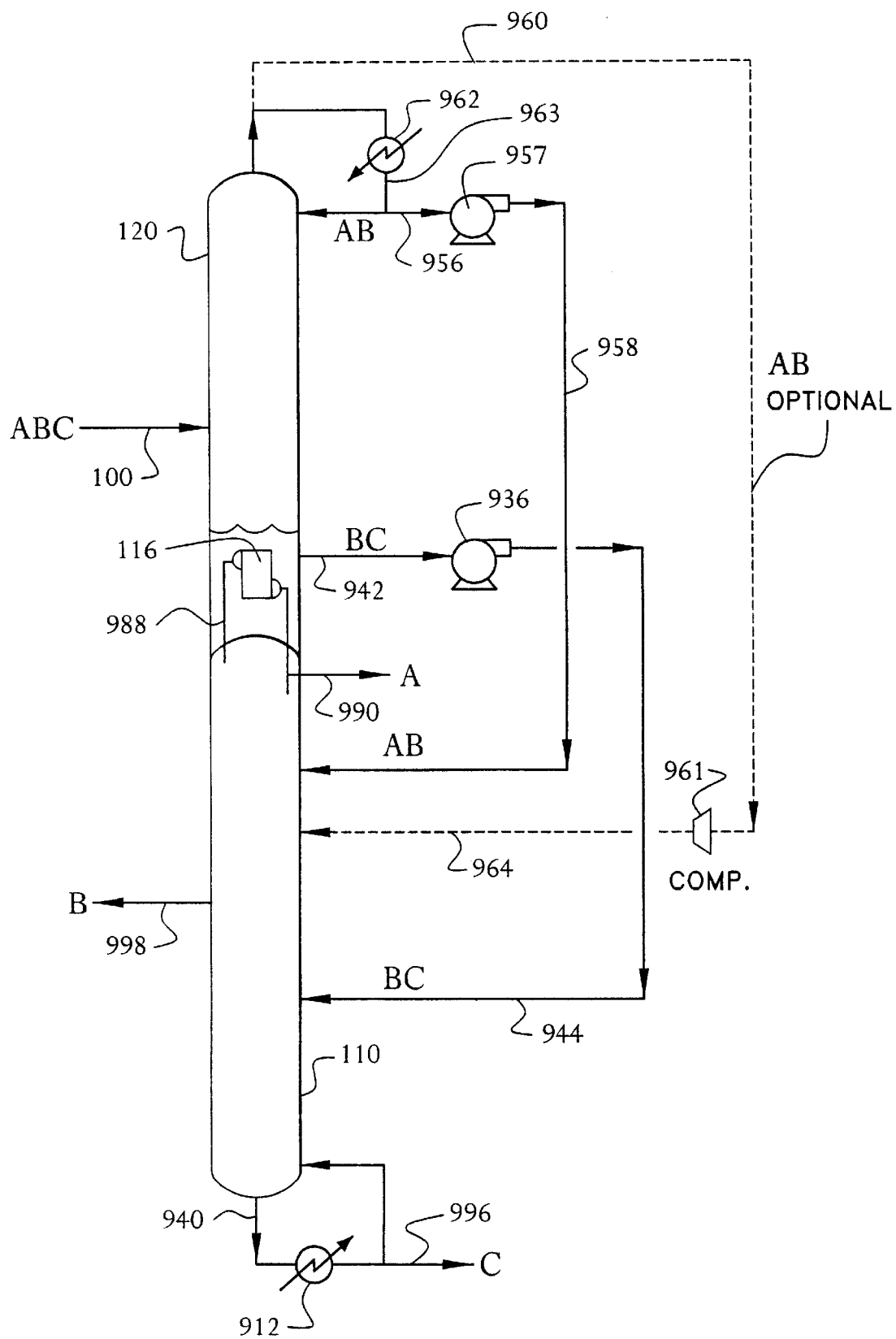
FIG. 9 is a schematic diagram of a fifth embodiment of the present invention.

FIG. 9 shows another process according to the current invention where the thermally linked distillation column of step (i) is the low pressure column and the thermally linked distillation column that is thermally linked to the low pressure column in step (iv) is the high pressure column. The mixture stream in step (i) is the ternary feed stream. Now the feed 100 is fed to an intermediate location of the low pressure column. A liquid submixture stream 956 lean in the least volatile component C but containing components A and B is produced from the top of the low pressure column 110. The liquid submixture stream 956 is then pumped through pump 957 and fed as stream 958 to the high pressure column. Optionally, in addition to or in lieu of liquid submixture stream 956, a vapor submixture stream 960 lean in the least volatile component C can be withdrawn from the top of the low pressure column and after compression in compressor 961 is fed to an appropriate location of the high pressure column as stream 964. A liquid submixture stream 942 lean in the most volatile component A but containing components B and C is withdrawn from the bottom of the low pressure column. This liquid submixture stream lean in the most volatile component A is then pumped through pump 936 and fed as stream 944 to the high pressure column 110. A product stream 998 rich in component B of the intermediate volatility is produced from an intermediate location of the high pressure column and a product stream 996 rich in the least volatile component C is collected from the bottom of this column. A product stream 990 rich in the most volatile component A is collected from the top of the high pressure column.

In the process of FIG. 9, the submixture 944 lean in the most volatile component A is fed at an intermediate location of the high pressure column 110 to produce relatively pure C-rich stream 996. In certain applications, the product stream 996 may not be desired to be of high purity in C. For such cases, no separation stages may be used below the feed location of the submixture stream 944 to the high pressure column. Now the liquid from the bottom of the high pressure column will be sent to a partial reboiler 912, i.e., the exiting phase of the stream from the reboiler will be two-phase and while the vapor would be sent as boilup to the bottom of the high pressure column, the liquid would be collected as product stream 996.

Figure 10:
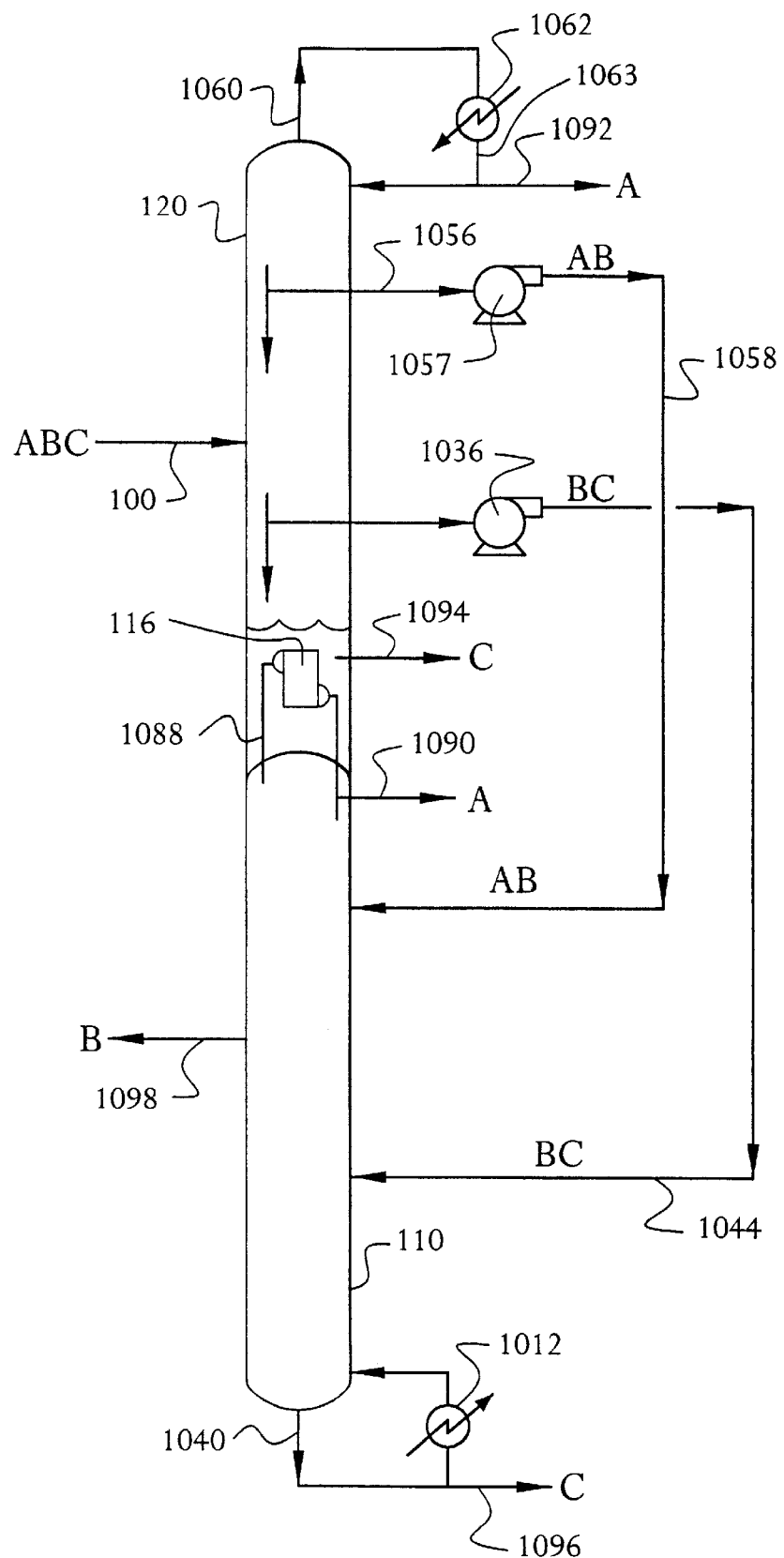
FIG. 10 is a schematic diagram of a sixth embodiment of the present invention.

The process in FIG. 10 is similar to the one in FIG. 9. However, in analogy to the process in FIG. 8, two additional product streams are produced from the thermally linked distillation column receiving the feed mixture of step (i). Therefore, from the low pressure column 120 two additional product streams (A, C) each from one end are recovered. From the top of the low pressure column a product stream 1092 enriched in the most volatile component A is recovered and from the bottom of that column a product stream 1094 enriched in the least volatile component C is recovered. Optionally, in analogy to the processes in FIGS. 6 and 7, only one of these two product streams (1092, 1094) could be produced from the low pressure column.

The thermal linking between the high pressure column 110 and the low pressure column 120 can be achieved in several ways. It is not necessary to condense the vapor from the top of the high pressure column by heat exchange against the liquid from the bottom of the low pressure column. Alternatively, a portion of the vapor from any suitable place in the top section of the high pressure column above the feed to this distillation column may be condensed against a liquid stream from the bottom section of the low pressure column below the feeds to this distillation column.

Figure 11:
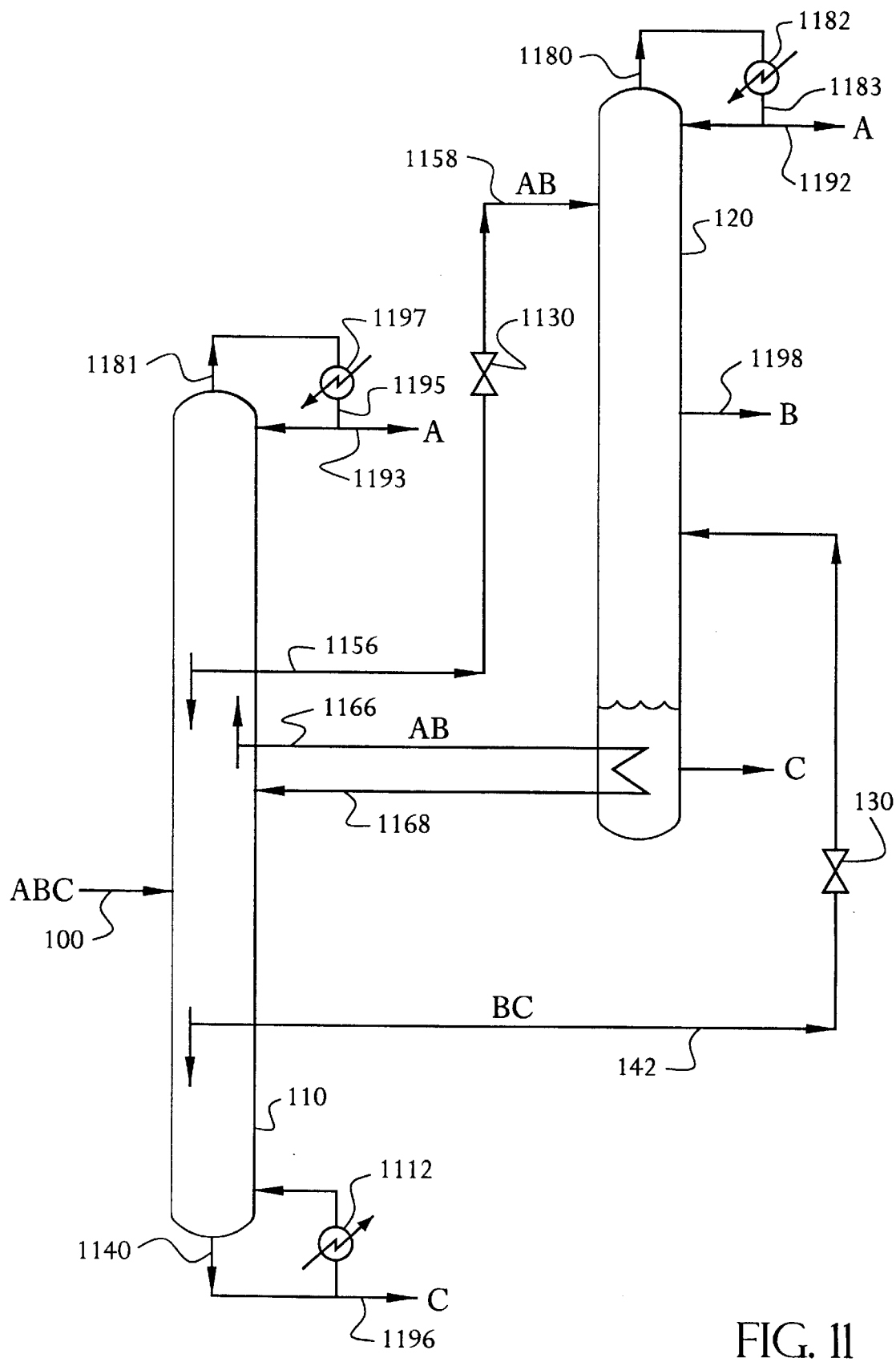
FIG. 11 is a schematic diagram of a seventh embodiment of the present invention.

FIG. 11 shows a process that is similar to the process in FIG. 8 except for the method of thermal linking. Now a vapor stream 1166 above the feed location is withdrawn from the high pressure column 110 and is at least partially condensed by heat exchange against the bottom liquid of the low pressure column 120 and then returned to the high pressure column as stream 1168. In FIG. 11, the condensed stream 1168 is returned to the same location as the withdrawal location of the vapor stream 1166. Alternatively, condensed stream 1168 could be fed a couple of stages above the withdrawal location of vapor stream 1166. The vapor stream from the top of the high pressure column is now condensed in another condenser. The submixture stream 1156 lean in the least volatile component C can be drawn from any suitable location of the high pressure column. However, in the process of FIG. 11 it is withdrawn at the same location as the vapor stream 1166. In FIG. 11, the submixture stream 1156 may constitute either a portion or all of the liquid stream descending from the top of the high pressure column.

The processes described in FIGS. 5 through 11 are described for ternary feed mixtures. However, the processes also can be utilized to distill feed mixtures containing more than three components into multiple product streams. There are multiple choices that would exist regarding the concentration of each component in each of the product streams. It will depend on the composition of submixture streams as they are drawn from the thermally linked distillation column according to steps (ii) and (iii) of the invention and then further distilled according to step (iv) of the invention in the second thermally linked distillation column.

Figure 12:
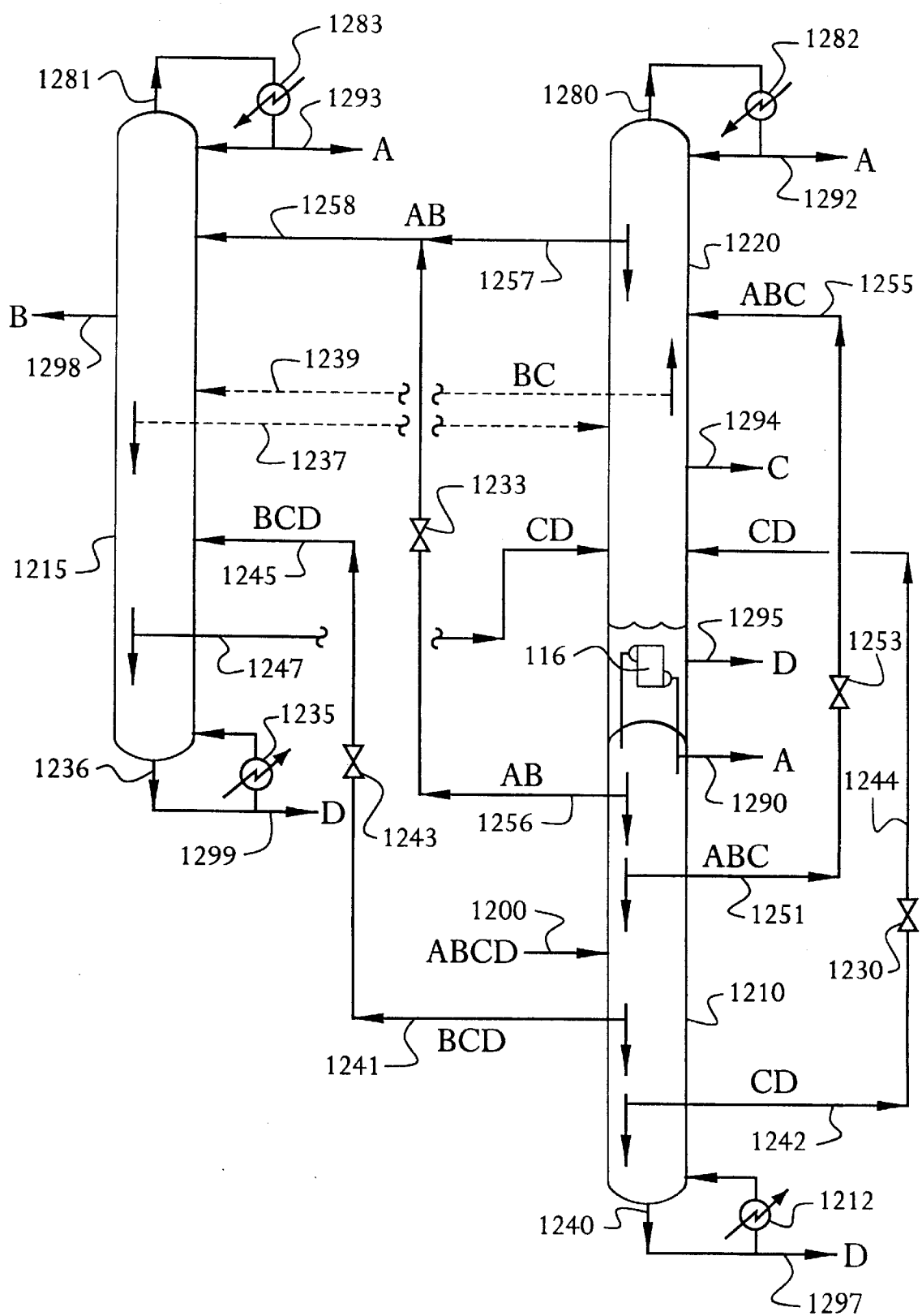
FIG. 12 is a schematic diagram of an eighth embodiment of the present invention.

It also is possible to use the processes of the current invention to distill feed mixtures using more than two distillation columns. This will be more attractive particularly when the feed mixture contains four or more components. The process in FIG. 12 shows an example of distilling a four-component feed mixture using three distillation columns. The feed mixture 1200 contains components A, B, C and D. A is the most volatile component and D is the least volatile component; B is more volatile than C. In FIG. 12, the high pressure column 1210 is the thermally linked column of step (i) to which a mixture stream is fed. In this case the mixture stream in step (i) is the same as the four-component feed stream. Therefore, the feed stream 1200 is fed to the high pressure column 1210. According to step (ii) at least one submixture stream lean in the least volatile component D is to be withdrawn from a location above the feed point 1200 of the high pressure column. In FIG. 12, two such submixture streams 1251 and 1256 are withdrawn. Stream 1256 is essentially a binary mixture containing A and B whereas stream 1251 also contains C. Similarly, following step (iii) of the invention, two submixture streams 1241 and 1242, each lean in the most volatile component A, are withdrawn from locations below the feed to the high pressure column. The low pressure column 1220 is the thermally linked column of step (iv) to which at least one of the submixture streams from the high pressure column must be fed. In FIG. 12, two submixture streams 1251 and 1242 are fed at appropriate locations of the low pressure column 1220.

There is a third distillation column 1215 having an operating pressure similar to the pressure of the low pressure column 1220. The other two submixture streams 1256 and 1241 from the high pressure column 1210 are fed at appropriate locations of the third distillation column 1215. Note that a submixture stream 1257 lean in both the heavy components C and D but containing A and B is withdrawn from the low pressure column and sent to the third distillation column 1215. In FIG. 12, both streams 1256 and 1257 are mixed and fed together as stream 1258 to the third distillation column 1215. If the composition of streams 1256 and 1257 is quite dissimilar, then the streams could be fed at different locations of the third distillation column 1215. In yet another alternative, stream 1256 could be split between the third distillation column 1215 and the low pressure column 1220. Similarly a submixture stream 1247 lean in both the volatile components A and B but containing C and D is withdrawn from the third distillation column 1215 and sent to the low pressure column 1220. Transport of submixture streams 1237 and 1239 containing components of only intermediate volatility B and C between the low pressure column 1220 and the third distillation column 1215 is optional. Three product streams 1290, 1292 and 1293 each enriched in the most volatile component A are produced from the top of each of the distillation columns. Similarly, three product streams 1295, 1297 and 1299 each enriched in the least volatile component D is produced from the bottom of each of the distillation columns. A product stream 1298 enriched in component B is produced from the third distillation column 1215. A product stream 1294 enriched in component C is produced from the low pressure column 1220.

There are several possible variations of the process of FIG. 12. One or more streams and distillation sections may be eliminated to simplify the process. For example, one of the two submixture streams 1251 and 1256 that are lean in least volatile component D could be eliminated. Similarly, one of the two submixture streams 1241 and 1242 that are lean in most volatile component A could be eliminated. Also, the production of either one or both the product streams 1290 and 1297 can be eliminated from the high pressure column 1210. Production of product streams 1299 and 1292 also could be eliminated.

For example, in one option, the submixture streams 1251 and 1241, which are ternary mixtures, could be eliminated. Now, the low pressure column 1220 will get only one submixture stream 1242 from the high pressure column 1210. All the distillation sections above the recovery point of product C in stream 1294 would be eliminated from the low pressure column 1220. A condenser 1282 operating at the top of the low pressure column would be condensing a vapor stream enriched in C. Only the product streams enriched in C and D would be produced from the low pressure column. Similarly, the third distillation column 1215 will receive only submixture 1256 containing A and B This distillation column will only produce product streams enriched in A and B. In another alternative, the third distillation column 1215 could also be thermally linked with the high pressure column 1210. Skilled practitioners will recognize that there are several such options, and the examples discussed here are not meant to be exhaustive.

For the four-component feed mixture there are many more distillation configurations besides the one in FIG. 12 that can be drawn. For example, the feed mixture could be fed first to a distillation column where it is distilled to give a product stream either enriched in the most volatile component or the least volatile component and a ternary mixture stream. The possible ternary mixture streams are BCD and ABC. The resulting ternary mixture stream could then be fed to any of the processes shown in FIGS. 5 through 11 of the current invention. This is an example where the mixture stream to be fed to a thermally linked column in step (i) is not the given multicomponent feed stream, but a mixture stream that is derived by the distillation of the multicomponent feed stream in the other distillation columns contained in the process.

It is worth noting that when more than one product stream each enriched in the same component are produced from a process of the current invention, the exact composition of the product streams may or may not be the same. Furthermore, any desired portion of two or more of these product streams may be mixed to create additional product streams. In one option, all of these product streams could be combined to provide one product stream.

In the processes of FIGS. 6 through 8 and FIGS. 9 through 12, the submixture streams according to steps (ii) and (iii) are shown to be withdrawn as liquid streams from the thermally linked distillation column. However, either in addition to or in lieu of any liquid submixture stream a vapor submixture may be withdrawn from the thermally linked distillation column and fed to the thermally linked distillation column of step (iv).

For example, in FIG. 6, the submixture stream 556 may be a vapor stream which after a drop in pressure, either across a valve or a turbo expander, is fed to the low pressure column 120. In another alternative, the original liquid mixture stream 556 is retained and another vapor stream is withdrawn from the high pressure column 110 above the feed location and, after a drop in pressure, is fed to a suitable location of the low pressure column.

Another feature of the current invention is that additional reboilers and condensers may be used to make multieffect distillation processes more efficient. For example, rather than condensing all the vapor from the high pressure column in a reboiler/condenser that thermally links the high pressure and the low pressure columns, a portion of this vapor may be condensed in a separate condenser using another cooling source. The portion of this vapor for condensation may be drawn from any location above the feed to the high pressure column. After this condensation, a portion of the condensed liquid may be returned as reflux to the high pressure column.

For example, in FIG. 5, a portion of the vapor stream 550 can be condensed by heat exchange against a fluid stream other than the liquid from the bottom of the low pressure column 120 and either the condensed liquid is collected as a product stream or returned to the high pressure column 110 as reflux. Similarly, some additional boilup in the bottom section of the low pressure column can be provided by using a heat source other than the condensation of a vapor stream from the high pressure column. For example, in FIG. 5, a portion of the liquid in the low pressure column below the feed point of submixture stream 144 may be withdrawn and at least partially vaporized using another heat source. The vaporized stream can be returned to the low pressure column to provide the boilup need of this column.

In one option, a portion of the liquid at the bottom of the low pressure column can be vaporized using an alternate heat source and the vapor is returned to the bottom of the low pressure column. It also is possible to introduce heat duties, either positive or negative, to locations at which product streams rich in components of intermediate volatility are taken out, such as where B is taken out in FIGS. 5 through 12 and where C is taken out in FIG. 12. This may help increase controllability of the distillation columns, and may provide second law efficiency benefits in certain circumstances.

When according to steps (ii) and (iii) of the invention, a submixture stream is transferred from the thermally linked distillation column to another distillation column, it is possible to change the enthalpy of the submixture stream between such a transfer. For example, in the process of FIG. 5, the enthalpy of liquid submixture BC in stream 142 may be adjusted after it is withdrawn from the thermally linked distillation column 110. Therefore, this stream could be heated in an heat exchanger to a two-phase stream or an all vapor stream and then fed to distillation column 120. In another alternative, stream 142 could be split into two streams and enthalpy of only one or both the streams is adjusted and both the streams are fed at appropriate locations of distillation column 120. Thus, while a first portion of submixture stream 142 would be fed as shown in FIG. 5, the second portion could be heated to a two-phase or an all vapor stream and fed to a location that is several stages below the feed location of the first portion. It also is possible to heat both the first and second portions to different degrees such that their specific enthalpies are not the same and then feed them at different locations of distillation column 120. While these examples are given with enthalpy adjustment by heating, it does not preclude enthalpy adjustment by subcooling either a portion or all of the liquid mixture BC in stream 142. Enthalpy adjustment also can be done for the liquid submixture AB in line 556 of FIG. 5. Similarly, if a vapor stream was to be transferred between the columns, then its enthalpy also could be adjusted.

In the process of the current invention, a condenser is shown at the top of the low pressure column. It is possible that this condenser may not be used and liquid reflux stream for the low pressure column may be obtained from another source in a plant where the process of the current invention is utilized. Similarly, a reboiler is shown at the bottom of the high pressure column. It is possible that this reboiler may not be used and the vapor boilup for the high pressure column may be provided from another source in a plant where the process of the current invention is utilized. Also, heat pumping may be used between any reboiler and condenser.

If needed, a submixture stream in steps (ii) and/or (iii) when withdrawn as liquid from the thermally linked distillation column may be sent first to a storage vessel and then from the storage vessel to another distillation column. The accumulated volume in the storage vessel can dampen out any fluctuations and may make it easier to control the operation of the distillation columns.

In all of the flowsheets of FIGS. 5 through 12 some of the streams are designated by alphabetical names. This shows the particular component(s) in which that stream is enriched, and does not necessarily mean the absence of other components. Thus, a stream with letter A indicates a product stream enriched in component A and the stream could be a pure product stream or a stream contaminated with significant quantities of other components. Similarly, a stream with designation AB means that the stream is enriched in components A and B, and the stream either contains only components A and B or could contain smaller quantities of other heavier components such as C. Also, any of the components A, B, C and D may contain multiple chemical components with similar boiling temperatures at the pressures used in the process.

The present invention is applicable to the separation by distillation of any suitable feed mixture containing three or more components. Some examples of feed streams for which the present invention is applicable include nitrogen/oxygen/argon mixtures, benzene/toluene/xylene mixtures, nitrogen/carbon monoxide/methane mixtures, any combination of three or more components from C1 to C5 alcohols, any combination of three or more components from C1 to C6 hydrocarbons, or $C_4$ isomers. Some examples of hydrocarbon mixtures are: pentane-hexane-heptane; isopentane-pentane-hexane, butane-isopentane-pentane, and iso-butane-n-butane-gasoline.

Among the conventional prior art processes for ternary distillation, it is well known that the fully thermally coupled distillation process requires the least total heat duty. Recently it has been shown that the multieffect distillation processes of FIGS. 1 through 4 often require even less heat duty than the fully thermally coupled distillation process. The multieffect distillation processes drawn according to the current invention in FIGS. 5 through 12 generally will require even lower heat duty than the prior art multieffect distillation processes. Moreover, if an additional condenser is used at the top of the high pressure column and/or a reboiler at the bottom of the low pressure column, one would get thermodynamically a more efficient process. The reason for the improvement resides in the fact that the feed mixture is distilled in the thermally linked distillation column of step (i) to produce at least two submixture streams rather than one submixture stream as in the prior art processes of FIGS. 1 through 4. It is well known that when a multicomponent mixture containing three or more components is distilled in a single distillation column to produce a pure component at one end and a submixture at the other end, the concentration of components of intermediate volatility can reach to much higher values within the distillation column.

For example, in the prior art process of FIG. 1, the concentration of the component B can reach to much higher values inside the high pressure column than either in the feed stream or the product stream 190 or the submixture stream 142. This leads to substantial mixing losses and requires more heat duty. By producing at least two submixture streams, one from above the feed location and the other from below the feed location, such build up in concentration of components of intermediate volatility is either eliminated or reduced. This leads to a decrease in the boilup needed for distillation and makes the process of the current invention more efficient.

Furthermore, another aspect of the current invention is that as shown in FIGS. 6 through 8 and FIGS. 10 through 12, the multieffect distillation processes can produce at least two product streams that are enriched in the same component. Each of these two product streams is produced from a different distillation column. By producing a product stream from a thermally linked distillation column, the recovery of this product stream from the other distillation column is decreased. This can reduce the vapor flow requirement in either one or both the distillation columns and hence the decrease in heat duty. For example, if FIGS. 1 and 6 are compared, one finds that the extra production of an A-enriched product stream from the low pressure column decreases the production of A-rich stream from the high pressure column. This can lead to substantial reduction in the vapor flow from the high pressure column. When the vapor through the high pressure column is not substantially reduced but that of the low pressure column is substantially reduced, then some vapor from the top of the high pressure column can be condensed in an auxiliary condenser. The heat in the auxiliary condenser is rejected at a higher temperature than the heat in the condenser at the top of the low pressure column. This will make the process thermodynamically more efficient.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A process for multieffect distillation of a multicomponent fluid containing at least four components, each component having a different volatility, into at least three product streams, said process using a distillation column system having at least two distillation columns, including a first distillation column operating at a first pressure and a second distillation column operating at a second pressure, wherein the first and second distillation columns are thermally linked and each distillation column has a top, a bottom, and a plurality of locations between the top and the bottom, comprising the steps of:

feeding a mixture stream into the first distillation column at a first location, said mixture stream containing at least four components;

withdrawing a first submixture stream lean in a component having a lowest volatility from the first distillation column;

withdrawing a second submixture stream lean in a component having a highest volatility from the first distillation column;

feeding at least one of the first and second submixture streams into the second distillation column; and removing from the distillation column system a first product stream rich in the component having the lowest volatility, a second product stream rich in the component having the highest volatility, and at least one other product stream rich in a component having an intermediate volatility, said intermediate volatility being between the highest volatility and the lowest volatility.

2. A process as in claim 1 comprising the further step of removing from the distillation column system a fourth product stream rich in the component having the highest volatility.

3. A process as in claim 2 wherein the fourth product stream removed from the distillation column system is removed from the top of the first distillation column.

4. A process as in claim 1 comprising the further step of removing from the distillation column system a fourth product stream rich in the component having the lowest volatility.

5. A process as in claim 1 wherein the first submixture stream is withdrawn from the first distillation column at a location above the first location.

6. A process as in claim 1 wherein the second submixture stream is withdrawn from the first distillation column at a location below the first location.

7. A process as in claim 1 wherein the first pressure is higher than the second pressure.

8. A process as in claim 7 comprising the further step of reducing the pressure of at least one of the first and second submixture streams withdrawn from the first distillation column before the at least one submixture stream is fed into the second distillation column.

9. A process as in claim 8 wherein at least one of the first and second submixture streams is withdrawn from the first distillation column as a liquid.

10. A process as in claim 7 wherein the first and second distillation columns are thermally linked by condensing at least a portion of a vapor stream from the top of the first distillation column by heat exchange against at least a portion of a bottoms liquid from the bottom of the second distillation column.

11. A process as in claim 7 wherein the first and second distillation columns are thermally linked by condensing at least a portion of a vapor stream from an intermediate location above the first location by heat exchange against at least a portion of a bottoms liquid from the bottom of the second distillation column.

12. A cryogenic air separation unit using a process as in claim 1.

13. A process as in claim 1 wherein the multicomponent fluid is selected from the group consisting of nitrogen/oxygen/argon mixtures, benzene/toluene/xylene mixtures, nitrogen/carbon monoxide/methane mixtures, combinations of three or more components from C1 to C5 alcohols, and hydrocarbon mixtures, said hydrocarbon mixtures being selected from the group consisting of pentane-hexane-heptane, isopentane-pentane-hexane, butane-isopentane-pentane, iso-butane-n-butane-gasoline, and combinations of three or more components from C1 to C6 hydrocarbons or $C_4$ isomers.

14. A process as in claim 1 wherein the second product stream removed from the distillation column system is removed from the top of the second distillation column and the third product stream removed from the distillation column system is removed from an intermediate location of the second distillation column.

15. A process as in claim 1 wherein the mixture stream fed into the first distillation column is a stream of the multicomponent fluid.

16. A process for multieffect distillation of a multicomponent fluid containing at least three components, each component having a different volatility, into at least three product streams, said process using a distillation column system having at least two distillation columns, including a first distillation column operating at a first pressure and a second distillation column operating at a second pressure, wherein the first and second distillation columns are thermally linked and each distillation column has a top, a bottom, and a plurality of locations between the top and the bottom, comprising the steps of:

feeding a mixture stream into the first distillation column at a first location, said mixture stream containing at least three components;

withdrawing a first submixture stream lean in a component having a lowest volatility from the first distillation column;

withdrawing a second submixture stream lean in a component having a highest volatility from the first distillation column;

feeding at least one of the first and second submixture streams into the second distillation column;

removing from the distillation column system a first product stream rich in the component having the lowest volatility, a second product stream rich in the component having the highest volatility, and at least one other product stream rich in a component having an intermediate volatility, said intermediate volatility being between the highest volatility and the lowest volatility;

removing from the distillation column system a fourth product stream rich in the component having the highest volatility; and removing from the distillation column system a fifth product stream rich in the component having the lowest volatility.

17. A process as in claim 16 comprising the further steps of:

providing a third distillation column operating at a pressure lower than the operating pressure of one of the first and second distillation columns and about the same as the operating pressure of the other column;

withdrawing a third submixture stream lean in a component having a highest volatility from the first distillation column;

feeding the third submixture into the third distillation column;

withdrawing a fourth submixture stream lean in a component having a lowest volatility from the first distillation column;

feeding the fourth submixture stream into the third distillation column;

removing from the third distillation column a sixth product stream rich in the component having the lowest volatility;

removing from the third distillation column a seventh product stream rich in the component having the highest volatility; and removing from the third distillation column at least one other product stream rich in a component having an intermediate volatility, said intermediate volatility being between the highest volatility and the lowest volatility.

18. A process as in claim 16 wherein the fifth product stream is removed from the bottom of the first distillation column.

19. A process for multieffect distillation of a multicomponent fluid containing at least three components, each component having a different volatility, into at least three product streams, said process using a distillation column system having at least two distillation columns, including a first distillation column operating at a first pressure and a second distillation column operating at a second pressure lower than the first pressure, wherein the first and second distillation columns are thermally linked and each distillation column has a top, a bottom, and a plurality of locations between the top and the bottom, comprising the steps of:

feeding a mixture stream into the first distillation column at a first location, said mixture stream containing at least three components;

withdrawing a first submixture stream lean in a component having a lowest volatility from the first distillation column and withdrawing a second submixture stream lean in a component having a highest volatility from the first distillation column, wherein at least one of the first and second submixture streams is withdrawn from the first distillation column as a vapor;

reducing the pressure of at least one of the first and second submixture streams withdrawn from the first distillation column before feeding said at least one submixture stream into the second distillation column; and removing from the distillation column system a first product stream rich in the component having the lowest volatility, a second product stream rich in the component having the highest volatility, and at least one other product stream rich in a component having an intermediate volatility, said intermediate volatility being between the highest volatility and the lowest volatility.

20. A process for multieffect distillation of a multicomponent fluid containing at least three components, each component having a different volatility, into at least three product streams, said process using a distillation column system having at least two distillation columns, including a first distillation column operating at a first pressure and a second distillation column operating at a second pressure, the first pressure being lower than the second pressure, wherein the first and second distillation columns are thermally linked and each distillation column has a top, a bottom, and a plurality of locations between the top and bottom, comprising the steps of:

feeding a mixture stream into the first distillation column at a first location, said mixture stream containing at least three components;

withdrawing a first submixture stream lean in a component having a lowest volatility from the first distillation column;

withdrawing a second submixture stream lean in a component having a highest volatility from the first distillation column;

feeding at least one of the first and second submixture streams into the second distillation column; and removing from the distillation column system a first product stream rich in the component having the lowest volatility, a second product stream rich in the component having the highest volatility, and at least one other product stream rich in a component having an intermediate volatility, said intermediate volatility being between the highest volatility and the lowest volatility.

21. A process as in claim 20 comprising the further step of increasing the pressure of at least one of the submixture streams withdrawn from the first distillation column before the at least one submixture stream is fed into the second distillation column.

22. A process as in claim 21 wherein at least one of the first and second submixture streams is withdrawn from the first distillation column as a liquid.

23. A process as in claim 21 wherein at least one of the first and second submixture streams is withdrawn from the first distillation column as a vapor.

24. A process as in claim 20 wherein the first and second distillation columns are thermally linked by condensing at least a portion of a vapor stream from the top of the second distillation column by heat exchange against at least a portion of a bottoms liquid from the bottom of the first distillation column.

25. A process for multieffect distillation of a multicomponent fluid containing at least three components, each component having a different volatility, into at least three product streams, said process using a distillation column system having at least two distillation columns, including a first distillation column operating at a first pressure and a second distillation column operating at a second pressure, wherein the first and second distillation columns are thermally linked and each distillation column has a top, a bottom, and a plurality of locations between the top and the bottom, comprising the steps of:

feeding a mixture stream into the first distillation column at a first location, said mixture stream containing at least three components;

withdrawing a first submixture stream lean in a component having a lowest volatility from the first distillation column;

withdrawing a second submixture stream lean in a component having a highest volatility from the first distillation column;

feeding at least one of the first and second submixture streams into the second distillation column;

removing from the distillation column system a first product stream rich in the component having the lowest volatility, a second product stream rich in the component having the highest volatility, a third product stream rich in a component having an intermediate volatility, said intermediate volatility being between the highest volatility and the lowest volatility, and a fourth product stream rich in the component having the lowest volatility, wherein the fourth product stream is removed from the bottom of the first distillation column.

26. A process for multieffect distillation of a multicomponent fluid containing at least three components, each component having a different volatility, into at least three product streams, said process using a distillation column system having at least two distillation columns, including a first distillation column operating at a first pressure and a second distillation column operating at a second pressure, wherein the first and second distillation columns are thermally linked and each distillation column has a top, a bottom, and a plurality of locations between the top and the bottom, comprising the steps of:

feeding a mixture stream into the first distillation column at a first location, said mixture stream containing at least three components;

withdrawing a first submixture stream lean in a component having a lowest volatility from the first distillation column;

withdrawing a second submixture stream lean in a component having a highest volatility from the first distillation column;

feeding at least one of the first and second submixture streams into the second distillation column; and removing from the distillation column system a first product stream rich in the component having the lowest volatility, a second product stream rich in the component having the highest volatility, a third product stream rich in a component having an intermediate volatility, said intermediate volatility being between the highest volatility and the lowest volatility, and a fourth product stream rich in one of three components, wherein the first product stream is removed from the bottom of the second distillation column, the second product stream is removed from the top of the second distillation column, the third product stream is removed from an intermediate location of the second distillation column, and the fourth product stream is removed from the first distillation column.

27. A process for multieffect distillation of a multicomponent fluid containing three components, each component having a different volatility, into at least three product streams, said process using a distillation column system having at least two distillation columns, including a first distillation column operating at a first pressure and a second distillation column operating at a second pressure, wherein the first and second distillation columns are thermally linked and each distillation column has a top, a bottom, and a plurality of locations between the top and the bottom, comprising the steps of:

feeding a mixture stream into the first distillation column at a first location, said mixture stream containing at least three components;

withdrawing a first submixture stream lean in a component having a lowest volatility from the first distillation column;

withdrawing a second submixture stream lean in a component having a highest volatility from the first distillation column;

feeding both of the first and second submixture streams into the second distillation column;

removing from one of the first and the second distillation columns a first product stream rich in the component having the lowest volatility, a second product stream rich in the component having the highest volatility, and a third product stream rich in a component having an intermediate volatility, said intermediate volatility being between the highest volatility and the lowest volatility; and removing from the other one of the first and second distillation columns a fourth product stream rich in one of the three components.

28. A process as in claim 27, wherein the first submixture stream is withdrawn from the first distillation column at a location above the first location and the second submixture stream is withdrawn from the first distillation column at another location below the first location.

29. A process as in claim 27, wherein the first pressure is higher than the second pressure and wherein the first and second distillation columns are thermally linked by condensing at least a portion of a vapor stream from the first distillation column by heat exchange against at least a portion of a liquid from the second distillation column.

30. A process as in claim 27, wherein the second pressure is higher than the first pressure, and wherein the first and second distillation columns are thermally linked by condensing at least a portion of a vapor stream from the second distillation column by heat exchange against at least a portion of a liquid from the first distillation column.

31. A process as in claim 27, where in the multicomponent fluid is selected from t he group consisting of nitrogen/oxygen/argon mixtures, benzene/toluene/xylene mixtures, nitrogen/carbon monoxide/methane mixtures, combinations of three or more components from C1 to C5 alcohols, and hydrocarbon mixtures, said hydrocarbon mixtures being selected from the group consisting of pentane-hexane-heptane, isopentane-pentane-hexane, butane-isopentane-pentane, iso-butane-n-butane-gasoline, and combinations of three or more components from C1 to C6 hydrocarbons or $C_4$ isomers.

* * * * *